US010641411B2

(12) United States Patent
Saito et al.

(10) Patent No.: US 10,641,411 B2
(45) Date of Patent: May 5, 2020

(54) VALVE OPENING AND CLOSING SYSTEM AND VALVE CONTROL DEVICE

(71) Applicant: YOKOGAWA ELECTRIC CORPORATION, Musashino-shi, Tokyo (JP)

(72) Inventors: Hitoshi Saito, Musashino (JP); Noriharu Funaki, Musashino (JP); Yuu Nakajima, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 86 days.

(21) Appl. No.: 16/083,739

(22) PCT Filed: Jan. 26, 2017

(86) PCT No.: PCT/JP2017/002819
§ 371 (c)(1),
(2) Date: Sep. 10, 2018

(87) PCT Pub. No.: WO2017/154395
PCT Pub. Date: Sep. 14, 2017

(65) Prior Publication Data
US 2019/0136998 A1 May 9, 2019

(30) Foreign Application Priority Data
Mar. 11, 2016 (JP) .................................. 2016-048083

(51) Int. Cl.
*F16K 31/14* (2006.01)
*G08C 17/00* (2006.01)
(Continued)

(52) U.S. Cl.
CPC .............. *F16K 31/42* (2013.01); *F15B 21/08* (2013.01); *F16K 31/14* (2013.01); *G08C 17/00* (2013.01)

(58) Field of Classification Search
CPC .......... F16K 31/14; F16K 31/42; F15B 21/08; G08C 17/00; G08C 17/02
(Continued)

(56) References Cited

U.S. PATENT DOCUMENTS 6,685,159 B1 * 2/2004 Schnell ............... F15B 13/0426
251/129.04
7,337,041 B2 * 2/2008 Junk ....................... F15B 5/006
700/275
(Continued)

FOREIGN PATENT DOCUMENTS

EP      2853793 A1    4/2015
JP    2000-179742 A   6/2000
(Continued)

OTHER PUBLICATIONS

International Search Report (PCT/ISA/210) dated Mar. 14, 2017 issued by the International Searching Authority in International Application No. PCT/JP2017/002819.
(Continued)

*Primary Examiner* — Matthew W Jellett
(74) *Attorney, Agent, or Firm* — Sughrue Mion, PLLC (57) ABSTRACT

A valve opening and closing system includes: a site/center switching manual valve; a manual valve for opening and closing operation; an opening/closing switching electric driving valve that opens and closes a manual valve and that nullifies the manual valve for opening and closing operation; a center wireless transmitter that accepts and transmits an operation instruction including an opening and closing operation instruction and a forced closing operation instruction; and a site wireless transmitter, and a contact signal converter, the site side valve control device transmits both of the opening and closing operation instruction and the forced closing operation instruction to the contact signal converter when the site/center switching manual valve is switched to
(Continued)

the center control side, and interrupts the opening and closing operation instruction and transmits the forced closing operation instruction to the contact signal converter when the site/center switching manual valve is switched to on site.

4 Claims, 9 Drawing Sheets

(51) Int. Cl.
  *F16K 31/42* (2006.01)
  *F15B 21/08* (2006.01)
(58) Field of Classification Search
  USPC ............. 251/30.01, 30.02, 129.03, 129.04; 91/165
  See application file for complete search history.

(56) References Cited

U.S. PATENT DOCUMENTS

| | | | | |
|---|---|---|---|---|
| 8,555,917 | B2* | 10/2013 | Ataman | F16K 37/0083 137/551 |
| 9,163,619 | B2* | 10/2015 | Lymberopoulos | F04B 23/00 |
| 9,377,035 | B2* | 6/2016 | Gaarder | F15B 13/0846 |
| 9,958,880 | B2* | 5/2018 | Tarantino | G05B 15/02 |
| 10,177,565 | B2* | 1/2019 | Saito | F16K 31/06 |
| 10,218,533 | B2* | 2/2019 | Takai | H04Q 9/00 |
| 2015/0184772 | A1* | 7/2015 | Inagaki | F16K 31/14 137/554 |
| 2020/0014411 | A1* | 1/2020 | Saito | G08C 17/02 |

FOREIGN PATENT DOCUMENTS

JP 2014-1846 A 1/2014
JP 2014-66294 A 4/2014

OTHER PUBLICATIONS

Written Opinion (PCT/ISA/237) dated Mar. 14, 2017 issued by the International Searching Authority in International Application No. PCT/JP2017/002819.
Communication dated Oct. 23, 2019, from the European Patent Office in counterpart European Application No. 17762741.1.

* cited by examiner

| | SITE/CENTER SWITCHING MANUAL VALVE STATE | |
|---|---|---|
| | SITE | CENTER |
| OPENING AND CLOSING OPERATION INSTRUCTION | INTERRUPT | TRANSMIT |
| FORCED CLOSING OPERATION INSTRUCTION | TRANSMIT | TRANSMIT |

OPERATIONS OF CONTACT INFORMATION INTERLOCK UNIT

VALVE OPENING AND CLOSING SYSTEM AND VALVE CONTROL DEVICE

TECHNICAL FIELD

The present invention relates to a valve opening and closing system and a valve control device that are capable of performing forced closing operation from a center control side and requiring no electric wiring work on site.

BACKGROUND ART

Figure 6:
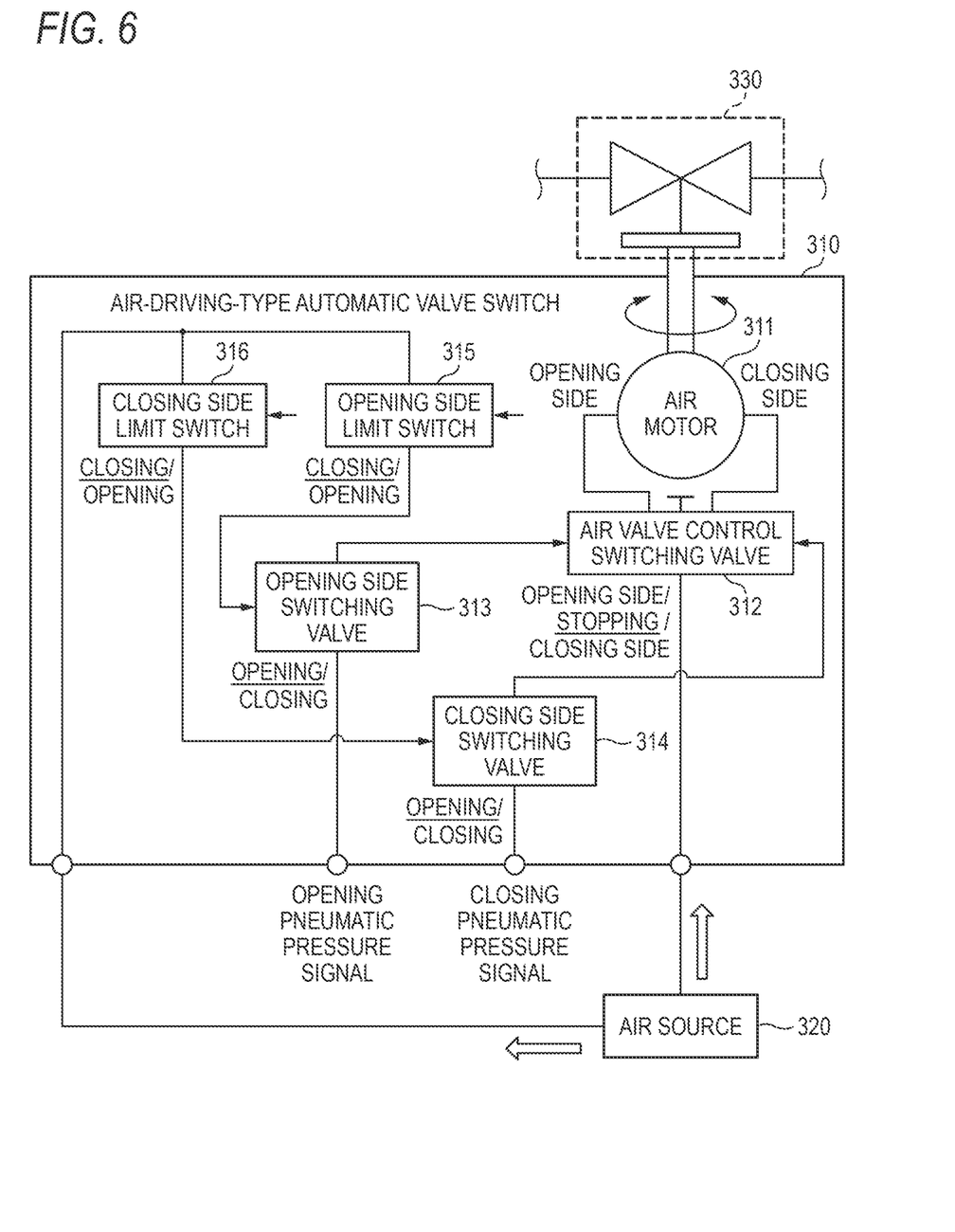
FIG. 6 It is a block diagram showing a configuration of an air-driving-type automatic valve switch.

An automatic value switch for remotely controlling a manual valve has been used practically by being mounted afterward on the existing manual valve. FIG. 6 is a block diagram showing a configuration of an air-driving-type automatic valve switch 310 that uses air supplied from an air source 320 as a driving source, and performs opening and closing operations of a manual valve 330 based on an opening pneumatic pressure signal and a closing pneumatic pressure signal inputted from outside.

The air-driving-type automatic valve switch 310 includes an air motor 311, an air valve control switching valve 312, an opening side switching valve 313, a closing side switching valve 314, an opening side limit switch 315 and a closing side limit switch 316. The air motor 311 is connected to the manual valve 330 so as to be opened or closed. The air valve control switching valve 312 switches an air path of the air motor 311 to any one of an opening side, a closing side, and stopping. The opening side switching valve 313 switches the air valve control switching valve 312 to an opening side based on the opening pneumatic pressure signal. The closing side switching valve 314 switches the air valve control switching valve 312 to a closing side based on the closing pneumatic pressure signal. The opening side limit switch 315 detects an opening side limit of the manual valve 330 and closes the opening side switching valve 313. The closing side limit switch 316 detects a closing side limit of the manual valve 330 and closes the closing side switching valve 314.

The air-driving-type automatic valve switch 310 may provide with an error lamp which indicates an opening and closing state, an air terminal which outputs, to the outside, that the opening and closing state of the manual valve 330 has reached the limit, or the like.

Figure 7:
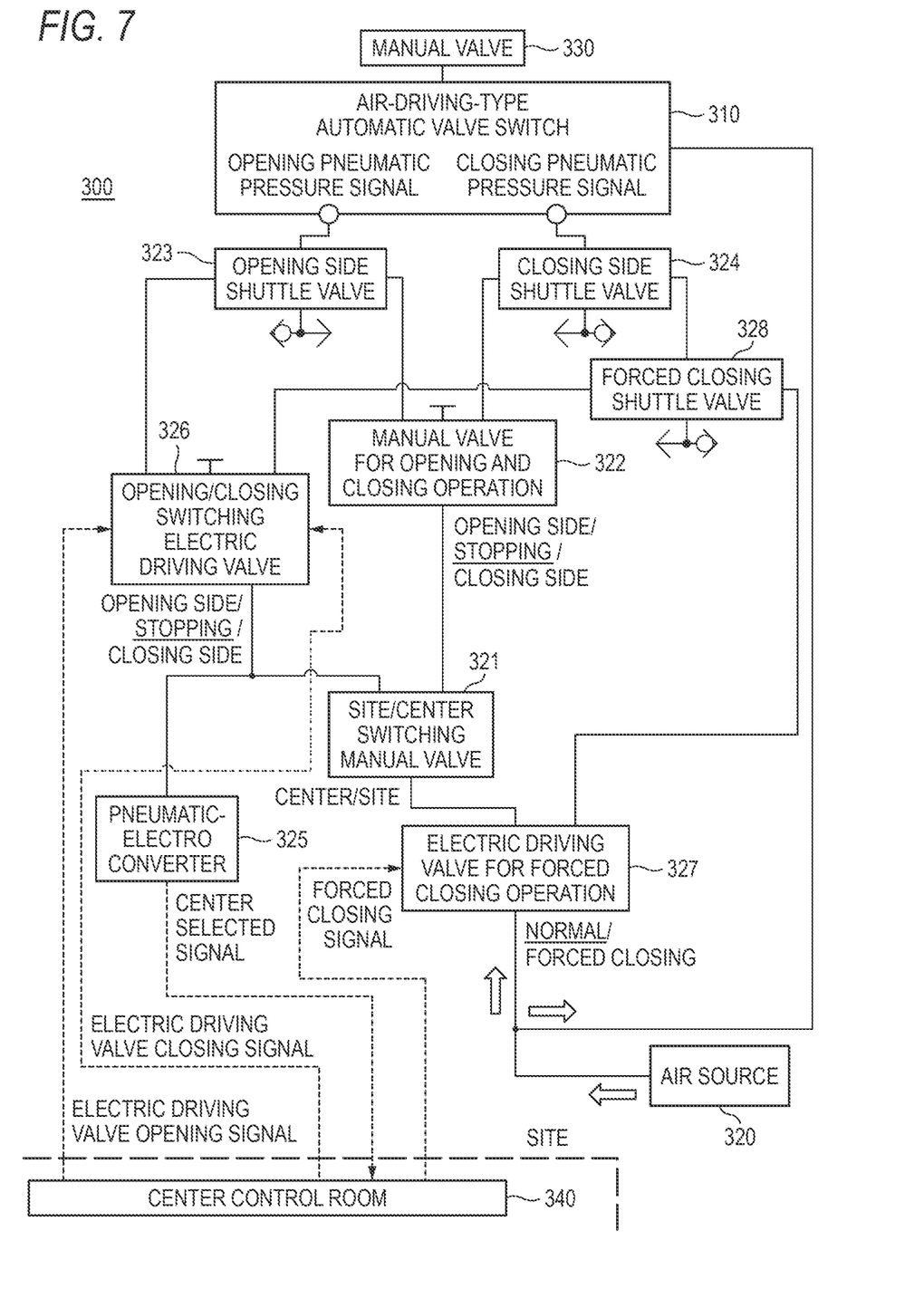
FIG. 7 It is a block diagram showing a configuration of a conventional valve opening and closing system.

FIG. 7 is a block diagram showing a configuration of a conventional valve opening and closing system 300 using the air-driving-type automatic valve switch 310. The valve opening and closing system 300 includes a site/center switching manual valve 321, which can be manually switched on site, between a site side and a center control room side to perform opening and closing operation of the manual valve 330.

In a case where the opening and closing operation of the manual valve 330 is performed on site, the opening and closing operations of the manual valve 330 can be enabled by manually operating a manual valve for opening and closing operation 322. Specifically, the following operations are performed by manually operating the manual valve for opening and closing operation 322. When the manual valve for opening and closing operation 322 is switched to an opening side, the opening pneumatic pressure signal is inputted to the air-driving-type automatic valve switch 310 via an opening side shuttle valve 323. When the manual valve for opening and closing operation 322 is switched to a closing side, a closing pneumatic pressure signal is inputted to the air-driving-type automatic valve switch 310 via a closing side shuttle valve 324.

When the site/center switching manual valve 321 is switched to a center side, air is supplied to an opening/closing switching electric driving valve 326, and a center selected signal is outputted and transmitted to the center control room 340 via a pneumatic-electro converter 326.

In this state, when the center control room 340 outputs an electric driving valve opening signal, the opening/closing switching electric driving valve 326 is switched to an opening side, the opening pneumatic pressure signal is inputted to the air-driving-type automatic valve switch 310 via the opening side shuttle valve 323. Further, when the center control room 340 outputs an electric driving valve closing signal, the opening/closing switching electric driving valve 326 is switched to a closing side, the closing pneumatic pressure signal is inputted to the air-driving-type automatic valve switch 310 via the closing side shuttle valve 324.

Additionally, when an emergency such as a disaster occurs, it is necessary to quickly close the manual valve 330 for safety. In which case, an electric driving valve for forced closing operation 327 is provided at a front stage of the site/center switching manual valve 321, and a forced closing shuttle valve 328 is provided between the closing side of the opening/closing switching electric driving valve 326 and the closing side shuttle valve 324 so that the center control room 340 can forcibly perform closing operation regardless of a switching state of the site/center switching manual valve 321.

When the center control room 340 outputs a forced closing signal to the electric driving valve for forced closing operation 327, the closing pneumatic pressure signal is inputted to the air-driving-type automatic valve switch 310 from the forced closing shuttle valve 328 via the closing side shuttle valve 324. Accordingly, the air-driving-type automatic valve switch 310 performs a closing operation.

CITATION LIST

Patent Literature

Patent literature 1: JP-A-2014-1846

SUMMARY OF INVENTION

Technical Problem

As described above, the electric driving valve for forced closing operation 327 is provided on site so that the forced closing operation can be performed from the center control room 340. For this reason, in addition to electric wiring from the center control room 340 to the opening/closing switching electric driving valve 326 and from the center control room 340 to the pneumatic-electro converter 325, it is necessary to lay electric wiring from the center control room 340 to the electric driving valve for forced closing operation 327. In general, since the center control room 340 is located remotely from the site, long-distance wiring work has to be performed, which causes an increase in cost of system construction.

Therefore, an object of the present invention is to provide a valve opening and closing system capable of performing forced closing operation from a center control side and requiring no electric wiring work on site.

Solution to Problem

In order to solve the above problems, a valve opening and closing system according to a first aspect of the present invention is a valve opening and closing system for remotely controlling opening and closing operations of a manual valve arranged on site from a center control side, the valve opening and closing system is characterize by including: a site/center switching manual valve that switches between a site side or a center control side to perform operation of the manual valve; a manual valve for opening and closing operation that performs opening and closing operation of the manual valve on site; an opening/closing switching electric driving valve that enables the opening and closing operations of the manual valve based on a driving signal, and that nullifies the manual valve for opening and closing operation during a closing operation; a center wireless transmitter that wirelessly accepts and transmits an operation instruction including an opening and closing operation instruction instructing an opening operation or a closing operation, and an forced closing operation instruction instructing a forced closing operation; and a site side valve control device that includes a receiving unit which receives the operation instruction wirelessly, and a converting unit which outputs a driving signal to the opening/closing switching electric driving valve based on the operation instruction, the site side valve control device includes an interlock unit that: acquires a switching state of the site/center switching manual valve, transmits both of the opening and closing operation instruction and the forced closing operation instruction received by the receiving unit to the converting unit in a case where the site/center switching manual valve is switched to the center control side, and interrupts the opening and closing operation instruction received by the receiving unit and transmits the forced closing operation instruction to the converting unit in a case where the site/center switching manual valve is switched to on site.

Here, the operation instruction may further include a forced opening operation instruction instructing a forced opening operation, and the interlock unit may transmit the forced opening operation instruction to the converting unit regardless of the switching state of the site/center switching manual valve.

In order to solve the above problems, a site side valve control device according to a second aspect of the present invention is characterized by including: a receiving unit that wirelessly receives an operation instruction including an opening and closing operation instruction instructing an opening operation or a closing operation, and an forced closing operation instruction instructing a forced closing operation; a converting unit that outputs a driving signal to an electric driving valve based on the operation instruction; and an interlock unit that: acquires information indicating presence or absence of a control right, transmits both of the opening and closing operation instruction and the forced closing operation instruction received by the receiving unit to the converting unit in a case where there is control right, and interrupts the opening and closing operation instruction received by the receiving unit and transmits the forced closing operation instruction to the converting unit in a case where there is no control right.

In order to solve the above problems, a valve control device according to a third aspect of the present invention is characterized by including: a center wireless transmitter that wirelessly accepts and transmits an operation instruction including an opening and closing operation instruction instructing an opening operation or a closing operation, and an forced closing operation instruction instructing a forced closing operation; and the site side valve control device described above.

Advantageous Effects of Invention

According to the present invention, there is provided a valve opening and closing system capable of performing forced closing operation from a center control side and requiring no electric wiring work on site.

DESCRIPTION OF EMBODIMENTS

Figure 1:
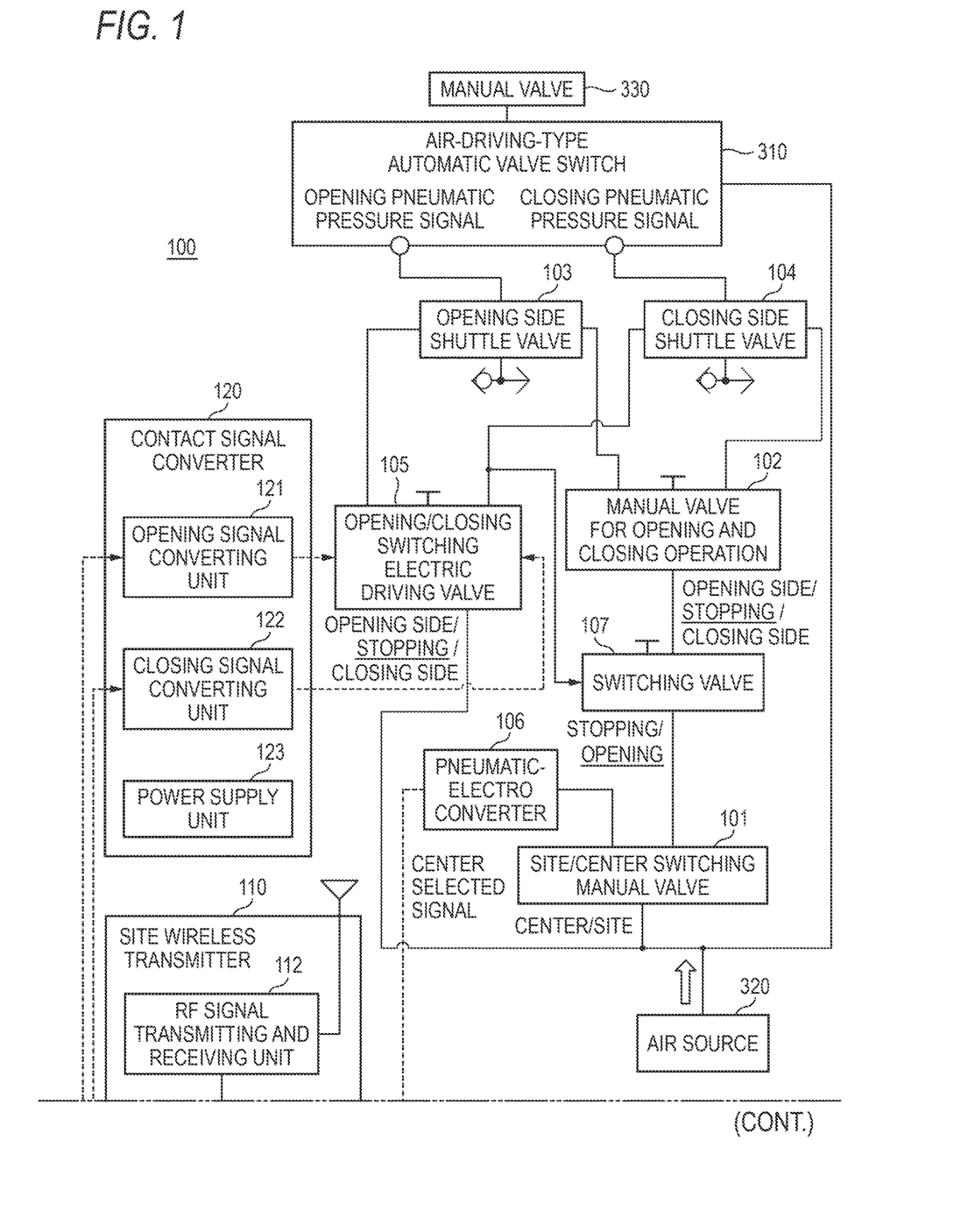
FIG. 1 It is a block diagram showing a configuration of a valve opening and closing system according to an embodiment.

An embodiment of the present invention is described with reference to the drawings. FIG. 1 is a block diagram showing a configuration of a valve opening and closing system 100 according to the embodiment. A manual valve 330 to be operated and an air-driving-type automatic valve switch 310 are the same as in the related art, and a general-purpose product can be used.

As shown in FIG. 1, the valve opening and closing system 100 includes a site/center switching manual valve 101, a manual valve for opening and closing operation 102, an opening side shuttle valve 103, a closing side shuttle valve 104, an opening/closing switching electric driving valve 105, a pneumatic-electro converter 106, a switching valve 107, a site wireless transmitter 110, a contact signal converter 120 and a center wireless transmitter 150.

The center wireless transmitter 150 is provided in a center control room and other equipment is provided on site. The site wireless transmitter 110 and the contact signal converter 120 configure a site side valve control device, and the site side valve control device and the center wireless transmitter 150 configure a valve control device.

The switching valve 107 is provided to nullify opening and closing operation on site when forced closing operation is performed from the center wireless transmitter 150, and the switching valve 107 is normally in an opening state. Air output by an air source 320 is supplied to the air-driving-type automatic valve switch 310, the site/center switching manual valve 101, and the opening/closing switching electric driving valve 105.

The site/center switching manual valve 101 is a valve for manually switching between a site side or a center control side via the center wireless transmitter 150 to perform opening and closing operation of the manual valve 330.

In a case where the opening and closing operation of the manual valve 330 is performed on site, opening and closing operations of the manual valve 330 can be enabled by manually operating the manual valve for opening and closing operation 102. Specifically, the following operations are performed by manually operating the manual valve for opening and closing operation 102. When the manual valve for opening and closing operation 102 is switched to an opening side, an opening pneumatic pressure signal is inputted to the air-driving-type automatic valve switch 310 via the opening side shuttle valve 103. When the manual valve for opening and closing operation 102 is switched to a closing side, a closing pneumatic pressure signal is inputted to the air-driving-type automatic valve switch 310 via the closing side shuttle valve 104.

However, in a case where forced closing operation is performed by the center wireless transmitter 150, since air supplied to the manual valve for opening and closing operation 102 is stopped by the switching valve 107, operation of the manual valve for opening and closing operation 102 is invalidated, and the opening and closing operation on site cannot be performed.

When the site/center switching manual valve 101 is switched to a center side, the pneumatic-electro converter 106 inputs a center selected signal to the site wireless transmitter 110. The center selected signal indicates the presence or absence of a control right of the center wireless transmitter 150.

The site wireless transmitter 110 includes a contact information analysis unit 111, an RF signal transmitting and receiving unit 112, a contact information interlock unit 113, a contact information output unit 114 and a power supply unit 115. The contact information analysis unit 111 determines a state of the site/center switching manual valve 101 based on the inputted center selected signal. The RF signal transmitting and receiving unit 112 performs wireless communication with the center wireless transmitter 150. The contact information interlock unit 113 is configured by software. The contact information output unit 114 outputs an opening signal or a closing signal based on an opening and closing operation instruction.

The contact signal converter 120 includes an opening signal converting unit 121, a closing signal converting unit 122, and a power supply unit 123. The opening signal converting unit 121 converts the opening signal from the contact information output unit 114 into an opening driving signal that switches the opening/closing switching electric driving valve 105 to the opening side. The closing signal converting unit 122 converts the closing signal from the contact information output unit 114 into a closing driving signal that switches the opening/closing switching electric driving valve 105 to the closing side.

The center wireless transmitter 150 is a device that accepts remote control of the manual valve 330 in the center control room, and includes an opening and closing operation unit 151, a forced closing operation unit 152 and an RF signal transmitting and receiving unit 153. The opening and closing operation unit 151 accepts an opening and closing operation instruction of the manual valve 330. The forced closing operation unit 152 accepts a forced closing operation instruction of the manual valve 330. The RF signal transmitting and receiving unit 153 performs wireless communication with the site wireless transmitter 110.

The opening and closing operation instruction accepted by the opening and closing operation unit 151, and the forced closing operation instruction accepted by the forced closing operation unit 152 are transmitted to the contact information interlock unit 113 of the site wireless transmitter 110 by wireless communication.

Figure 2:
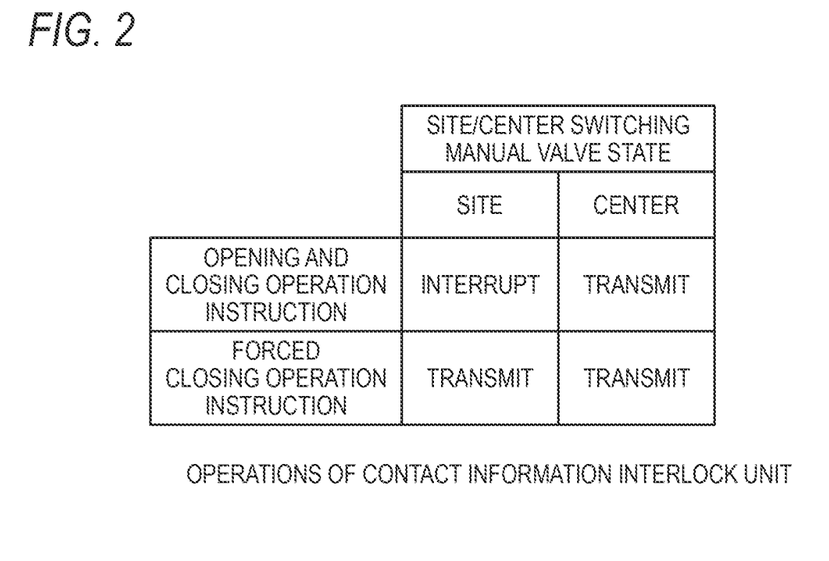
FIG. 2 It is a view for explaining operations of a contact information interlock unit.

The contact information interlock unit 113 acquires a state of the site/center switching manual valve 101 determined by the contact information analysis unit 111, and performs the operations as shown in FIG. 2 in response to an operation instruction transmitted from the center wireless transmitter 150.

That is, in a case where the site/center switching manual valve 101 is switched to a site side, the contact information interlock unit 113 interrupts the opening and closing operation instruction, and does not output the opening and closing operation instruction to the contact information output unit 114. Therefore, the opening/closing switching electric driving valve 105 is in a stopping state, and the opening and closing operations of the manual valve 330 based on the opening and closing operation instruction from the center wireless transmitter 150 cannot be performed.

When the forced closing operation instruction is transmitted even in the case where the site/center switching manual valve 101 is switched to the site side, a closing operation instruction is transmitted to the contact information output unit 114. Therefore, the contact information output unit 114 sends the closing signal to the closing signal converting unit 122, and the closing signal converting unit 122 switches the opening/closing switching electric driving valve 105 to the closing side. As a result, the switching valve 107 is brought into a stopping state and the operation of the manual valve for opening and closing operation 102 on site is nullified, and also a closing operation of the manual valve 330 is preferentially performed since the closing pneumatic pressure signal is inputted to the air-driving-type automatic valve switch 310 via the closing side shuttle valve 104.

In a case where the site/center switching manual valve 101 is switched to the center side, both the opening and closing operation instruction and the forced closing operation instruction are transmitted to the contact information output unit 114. Therefore, the opening and closing operations based on the opening and closing operation instruction transmitted from the center wireless transmitter 150 are performed.

As described above, according to the valve opening and closing system 100 of this embodiment, electric wiring work from a center control side to the site side is not necessary since operation instruction on the center control side can be wirelessly transmitted to the site side.

In addition, the contact information interlock unit 113 is configured to transmit both the opening and closing operation instruction and the forced closing operation instruction to the contact information output unit 114 in the case where the site/center switching manual valve 101 is switched to the center side, and the contact information interlock unit 113 is configured to interrupt the opening and closing operation instruction and to transmit only the forced closing operation instruction to the contact information output unit 114 in the case where the site/center switching manual valve 101 is switched to the site side. Therefore, the valve opening and closing system 100 can perform the forced closing operation from the center control side.

Figure 3:
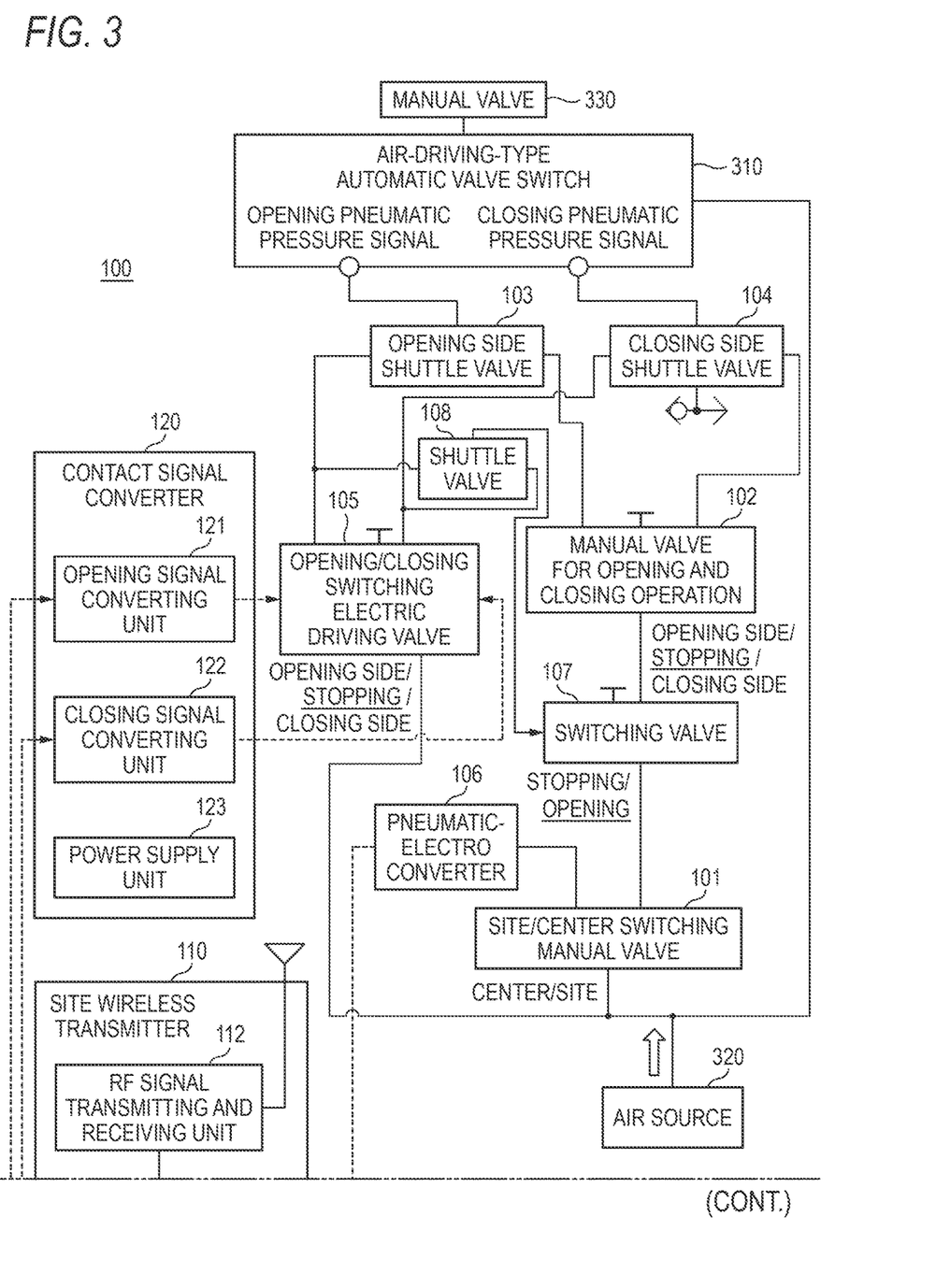
FIG. 3 It is a block diagram showing a modification in which forced opening operation is enabled.

Additionally, the present invention is not limited to the above embodiment, and various modifications can be made thereto. For example, as shown in FIG. 3, the center wireless transmitter 150 may include, instead of the forced closing operation unit 152, an enforced opening and closing operation unit 154 that can also accept a forced opening operation instruction.

In this case, even in the case where the site/center switching manual valve 101 is switched to the site side, the contact information interlock unit 113 also transmits the forced opening operation instruction to the contact information output unit 114 in addition to the forced closing operation instruction.

Further, in a case where the opening/closing switching electric driving valve 105 is switched to the opening side or the closing side, a shuttle valve 108 is used to switch the switching valve 107 to the stopping side and to nullify the operation of the manual valve for opening and closing operation 102 on site.

In the above embodiments, it is assumed that the opening/closing switching electric driving valve 105 is a direct acting type, but a double latch type may also be used. In the direct acting type electric driving valve, a driving state has to be maintained during the operation on the opening side or the closing side and electric power is consumed; while in the double latch type electric driving valve, a transition state can be maintained after driving for a short time and power consumption can be reduced.

Figure 4:
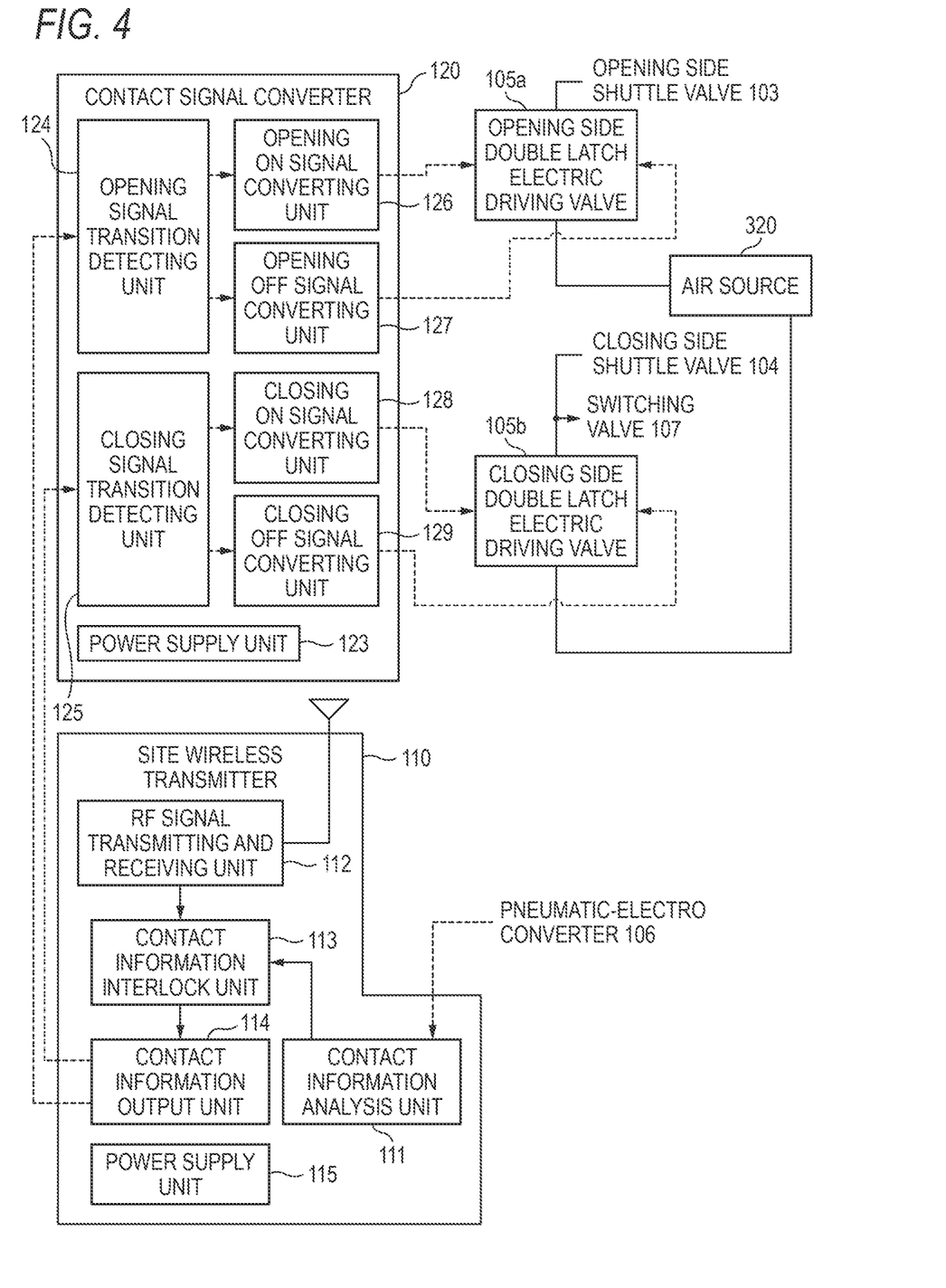
FIG. 4 It is a block diagram showing a modification in which a double latch electric driving valve is used.

FIG. 4 is a block diagram showing a configuration in which an opening side double latch electric driving valve 105a and a closing side double latch electric driving valve 105b are used instead of the opening/closing switching electric driving valve 105. In this case, the contact signal converter 120 includes an opening signal transition detecting unit 124, a closing signal transition detecting unit 125, an opening ON signal converting unit 126, an opening OFF signal converting unit 127, a closing ON signal converting unit 128, a closing OFF signal converting unit 129 and the power supply unit 123. The opening signal transition detecting unit 124 detects a change in an opening operation instruction signal, and the closing signal transition detecting unit 125 detects a change in a closing operation instruction signal. The opening ON signal converting unit 126 outputs an opening drive signal to the opening side double latch electric driving valve 105a for a predetermined short time in a case where the opening operation instruction signal is changed from OFF to ON. The opening OFF signal converting unit 127 outputs a closing driving signal to the opening side double latch electric driving valve 105a for a predetermined short time in a case where the opening operation instruction signal is changed from ON to OFF. The closing ON signal converting unit 128 outputs an opening drive signal to the closing side double latch electric driving valve 105b for a predetermined short time in a case where the closing operation instruction signal is changed from OFF to ON. The closing OFF signal converting unit 129 outputs a closing driving signal to the closing side double latch electric driving valve 105b for a predetermined short time in a case where the closing operation instruction signal is changed from ON to OFF.

Figure 5:
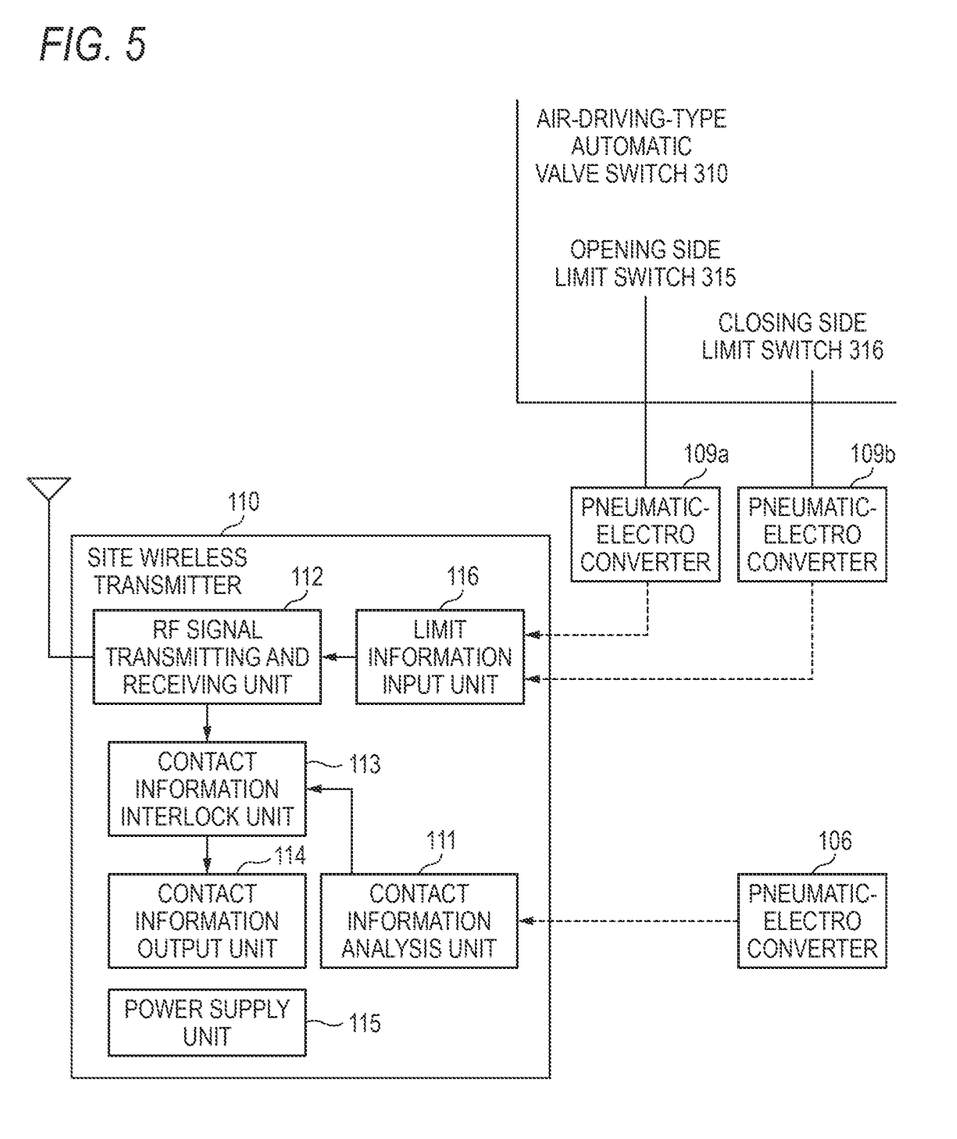
FIG. 5 It is a block diagram showing a modification in which limit information is notified to a center wireless transmitter.

Further, as shown in FIG. 5, the site wireless transmitter 110 may include a limit information input unit 116, and a limit state of the manual valve 330 may be notified to the center wireless transmitter 150 by wireless communication.

In this case, it is provided with a pneumatic-electro converter 109a for acquiring a state of an opening side limit switch 315 of the air-driving-type automatic valve switch 310 and a pneumatic-electro converter 109b for acquiring a state of a closing side limit switch 316 of the air-driving-type automatic valve switch 310, so as to acquire the limit state of the manual valve 330.

It should be noted that the above description merely shows specific preferred embodiments for explaining and illustrating the present invention. Therefore, the present invention is not limited to the above-described embodiment, and many changes and modifications can be made within the scope without departing from the scope of the present invention.

The present application is based on Japanese Patent Application No. 2016-048083 filed on Mar. 11, 2016, the contents of which are incorporated herein by reference. In addition, all references cited herein are incorporated in their entirety.

REFERENCE SIGN LIST

100 valve opening and closing system
101 site/center switching manual valve
102 manual valve for opening and closing operation
103 opening side shuttle valve
104 closing side shuttle valve
105 opening/closing switching electric driving valve
105a opening side double latch electric driving valve
105b closing side double latch electric driving valve
106 pneumatic-electro converter
107 switching valve
108 shuttle valve
109a, 109b pneumatic-electro converter
110 site wireless transmitter
111 contact information analysis unit
112 RF signal transmitting and receiving unit
113 contact information interlock unit
114 contact information output unit
115 power supply unit
116 limit information input unit
120 contact signal converter
121 opening signal converting unit
122 closing signal converting unit
123 power supply unit
124 opening signal transition detecting unit
125 closing signal transition detecting unit
126 opening ON signal converting unit
127 opening OFF signal converting unit
128 closing ON signal converting unit
129 closing OFF signal converting unit
150 center wireless transmitter
151 opening and closing operation unit
152 forced closing operation unit
153 RF signal transmitting and receiving unit
154 enforced opening and closing operation unit

The invention claimed is:

1. A valve opening and closing system for remotely controlling opening and closing operations of a manual valve arranged on site, from a center control side, the valve opening and closing system comprising:
   a site/center switching manual valve that switches between a site side or a center control side to perform operation of the manual valve;
   a manual valve for opening and closing operation that performs opening and closing operation of the manual valve on site;
   an opening/closing switching electric driving valve that enables the opening and closing operations of the manual valve based on a driving signal, and that nullifies the manual valve for opening and closing operation during a closing operation;
   a center wireless transmitter that wirelessly accepts and transmits an operation instruction including an opening and closing operation instruction instructing an opening operation or a closing operation, and a forced closing operation instruction instructing a forced closing operation; and
   a site side valve control device that includes a receiving unit which receives the operation instruction wirelessly, and a converting unit which outputs a driving signal to the opening/closing switching electric driving valve based on the operation instruction, wherein the site side valve control device includes an interlock unit that:
  acquires a switching state of the site/center switching manual valve,
  transmits both of the opening and closing operation instruction and the forced closing operation instruction received by the receiving unit to the converting unit in a case where the site/center switching manual valve is switched to the center control side, and
  interrupts the opening and closing operation instruction received by the receiving unit and transmits the forced closing operation instruction to the converting unit in a case where the site/center switching manual valve is switched to on site.

2. The valve opening and closing system according to claim 1, characterized in that,
  the operation instruction further includes an forced opening operation instruction instructing a forced opening operation, and
  the interlock unit transmits the forced opening operation instruction to the converting unit regardless of the switching state of the site center switching manual valve.

3. A site side valve control device comprising:
  a receiving unit that wirelessly receives an operation instruction including an opening and closing operation instruction instructing an opening operation or a closing operation, and an forced closing operation instruction instructing a forced closing operation;
  a converting unit that outputs a driving signal to an electric driving valve based on the operation instruction; and
  an interlock unit that:
    acquires information indicating presence or absence of a control right,
    transmits both of the opening and closing operation instruction and the forced closing operation instruction received by the receiving unit to the converting unit in a case where there is control right, and
    interrupts the opening and closing operation instruction received by the receiving unit and transmits the forced closing operation instruction to the converting unit in a case where there is no control right.

4. A valve control device comprising:
  a center wireless transmitter that wirelessly accepts and transmits an operation instruction including an opening and closing operation instruction instructing an opening operation or a closing operation, and an forced closing operation instruction instructing a forced closing operation; and
  a site side valve control device according to claim 3.

* * * * *